Figure 7:
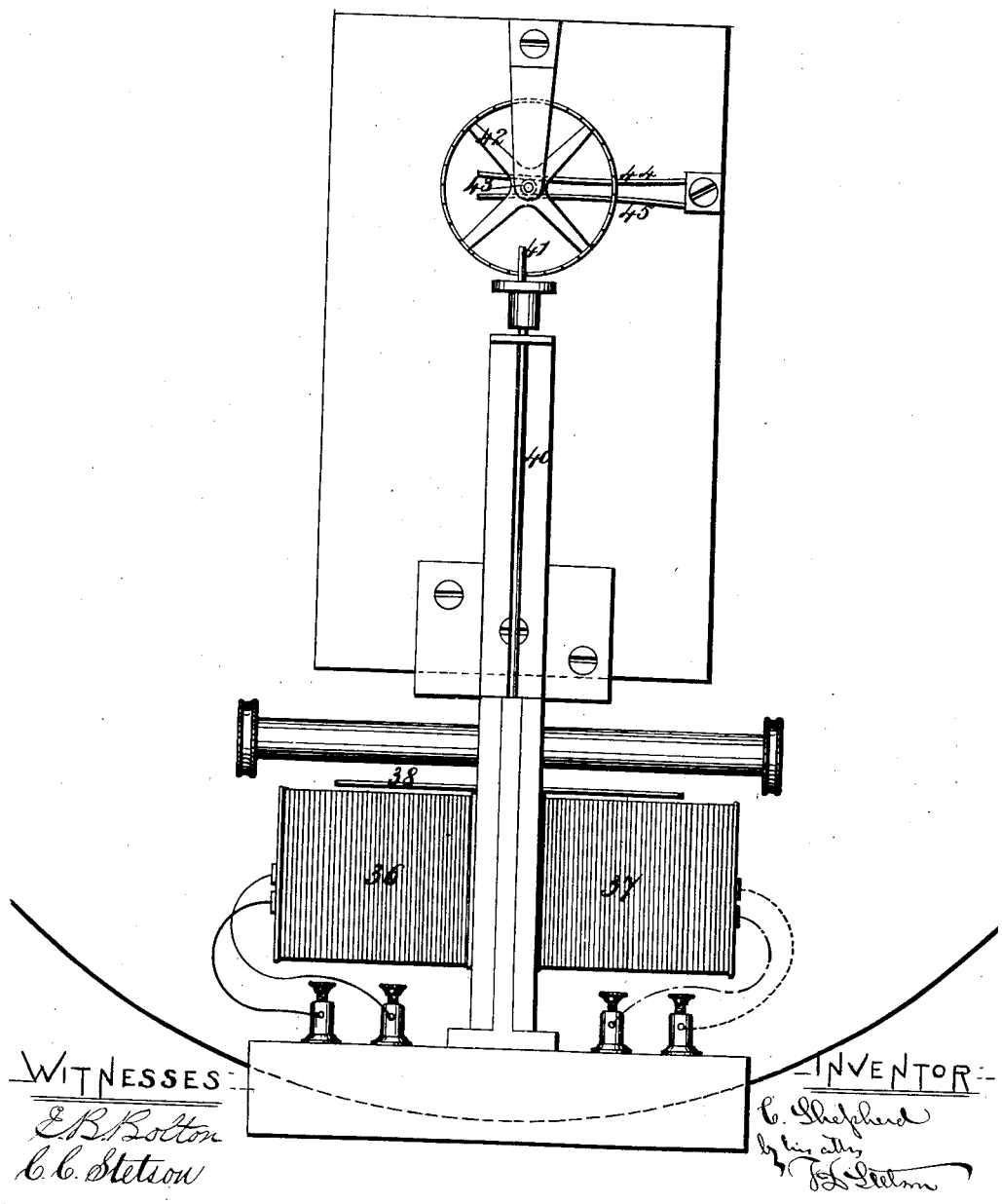

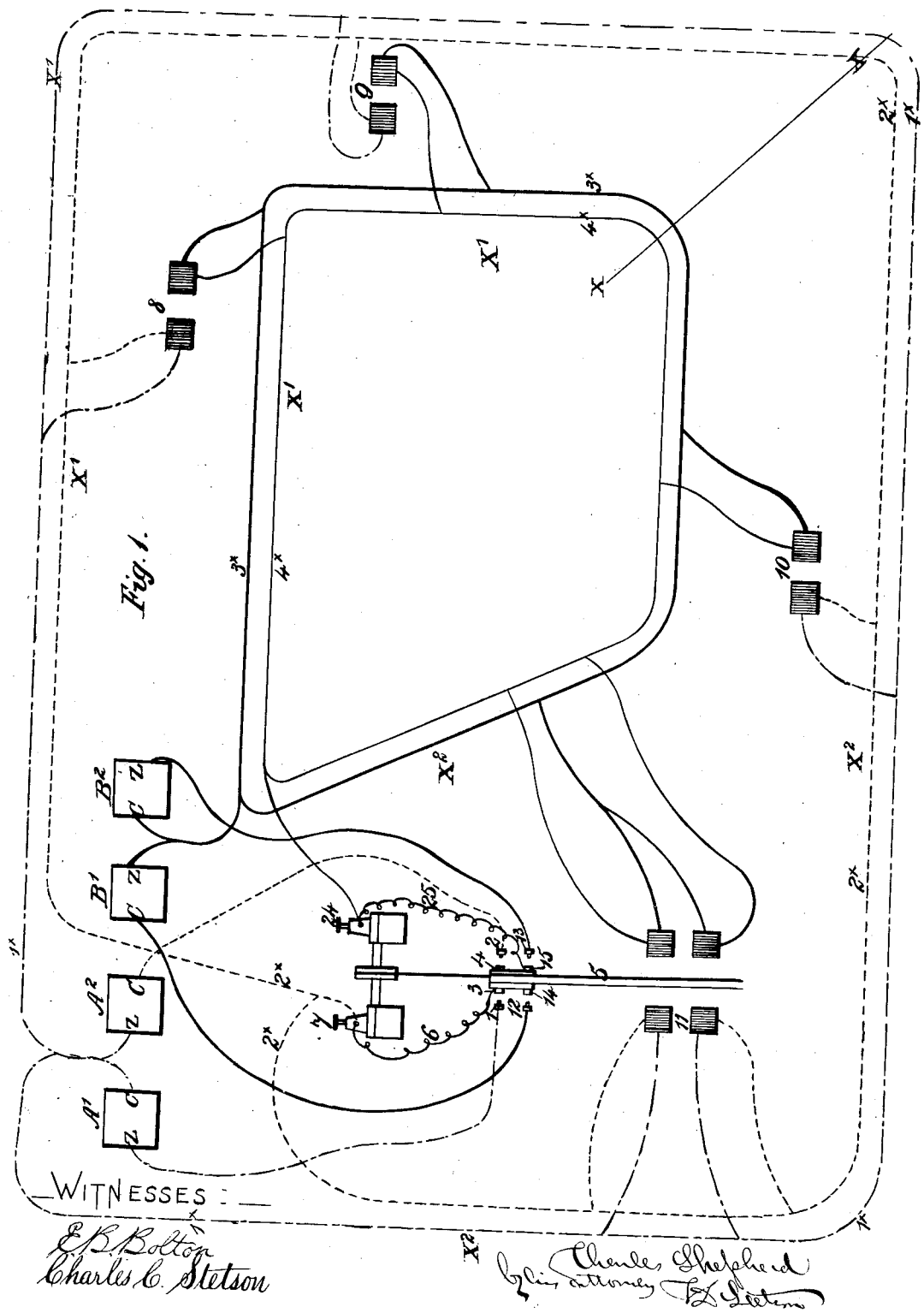

C. SHEPHERD.
Electro-Magnetic Clock.
No. 222,424. Patented Dec. 9, 1879.
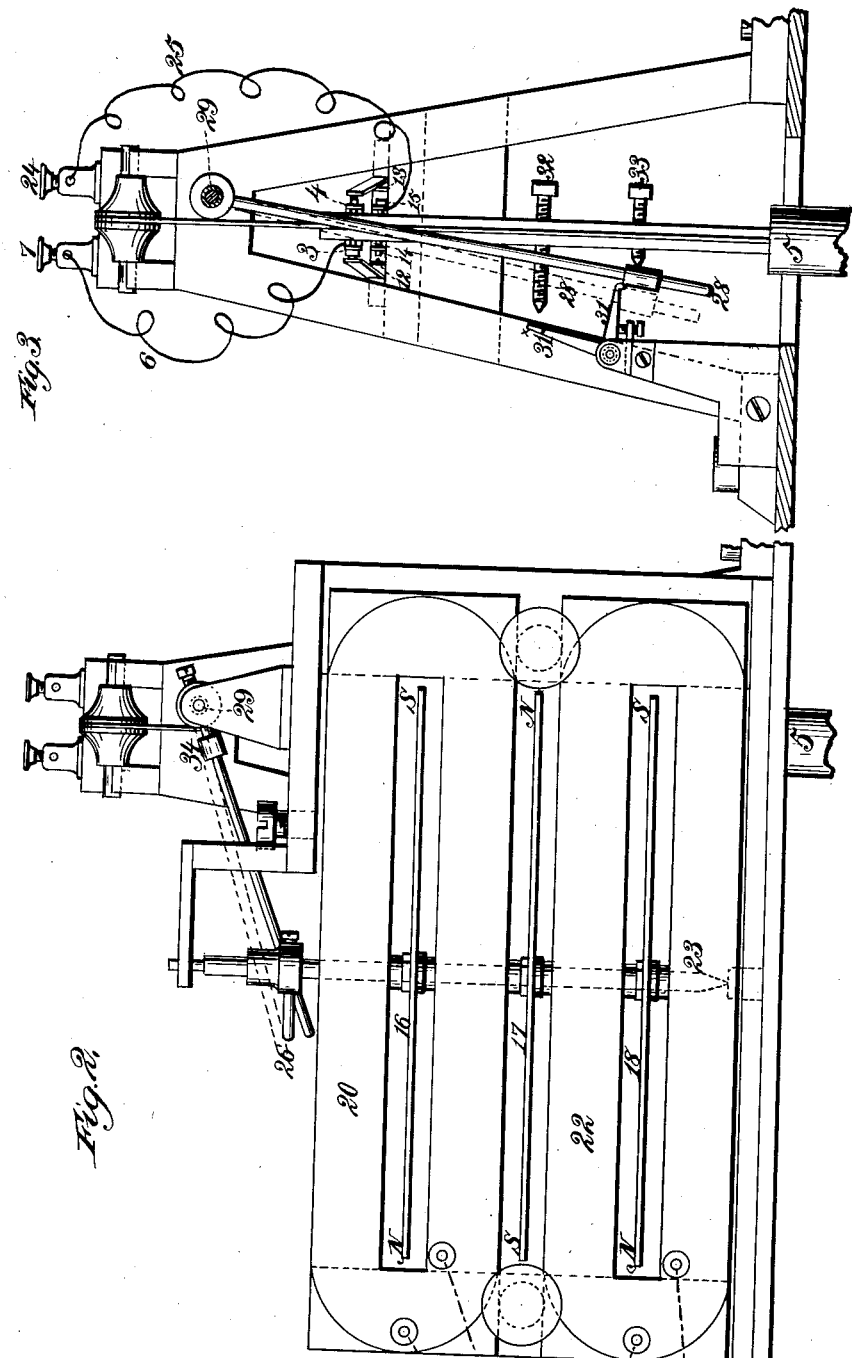
WITNESSES
INVENTOR
Charles Shepherd
by Thomas D. Stetson
ATTORNEY

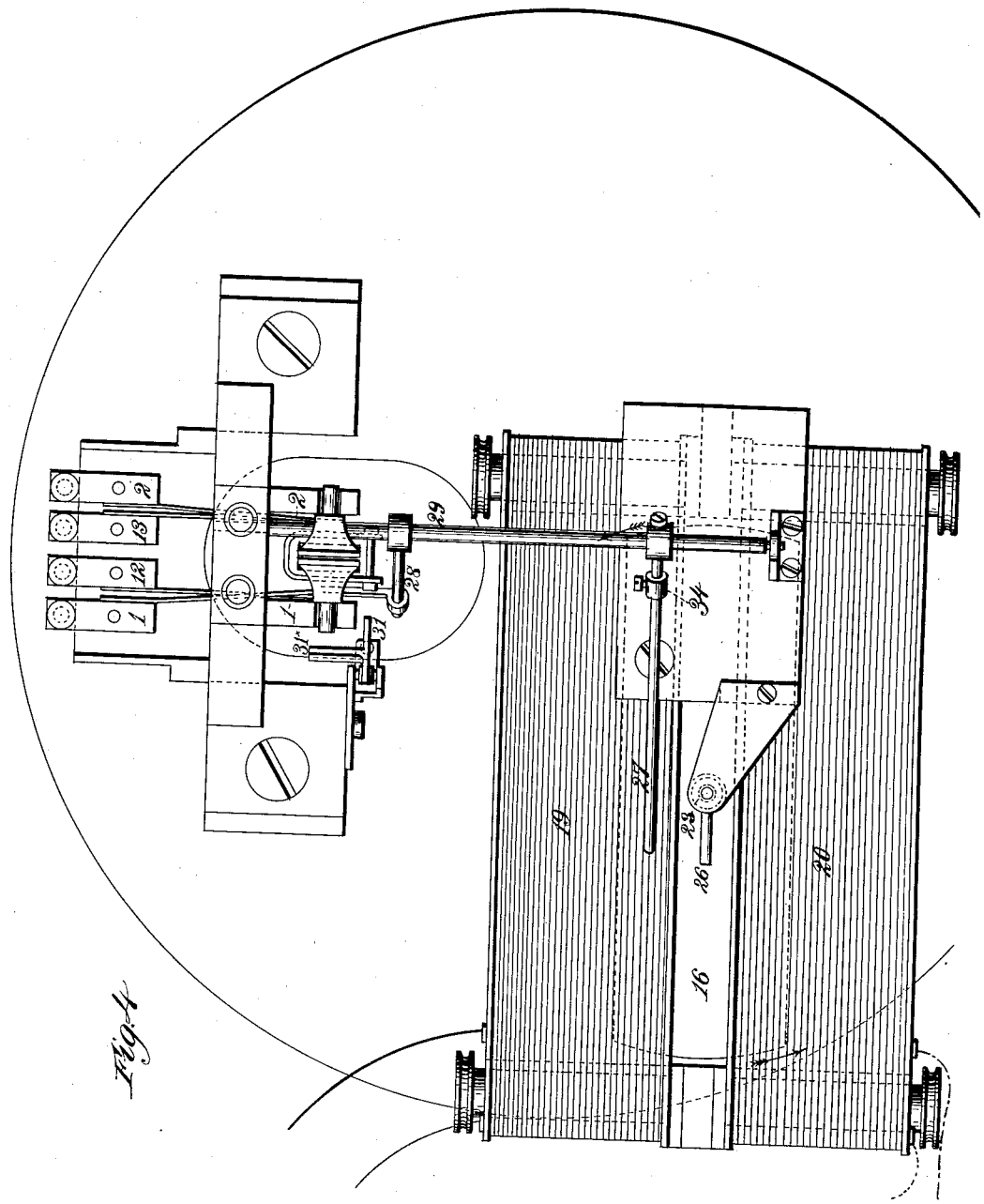

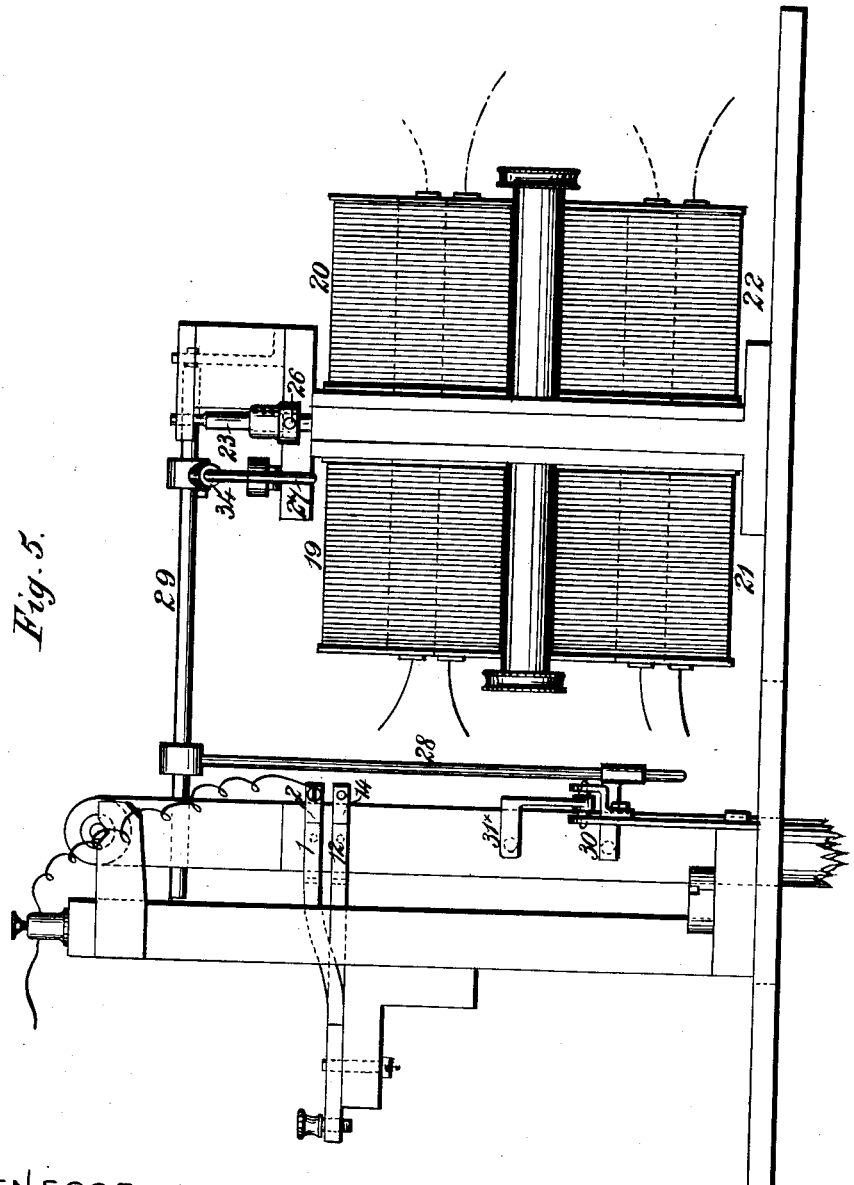

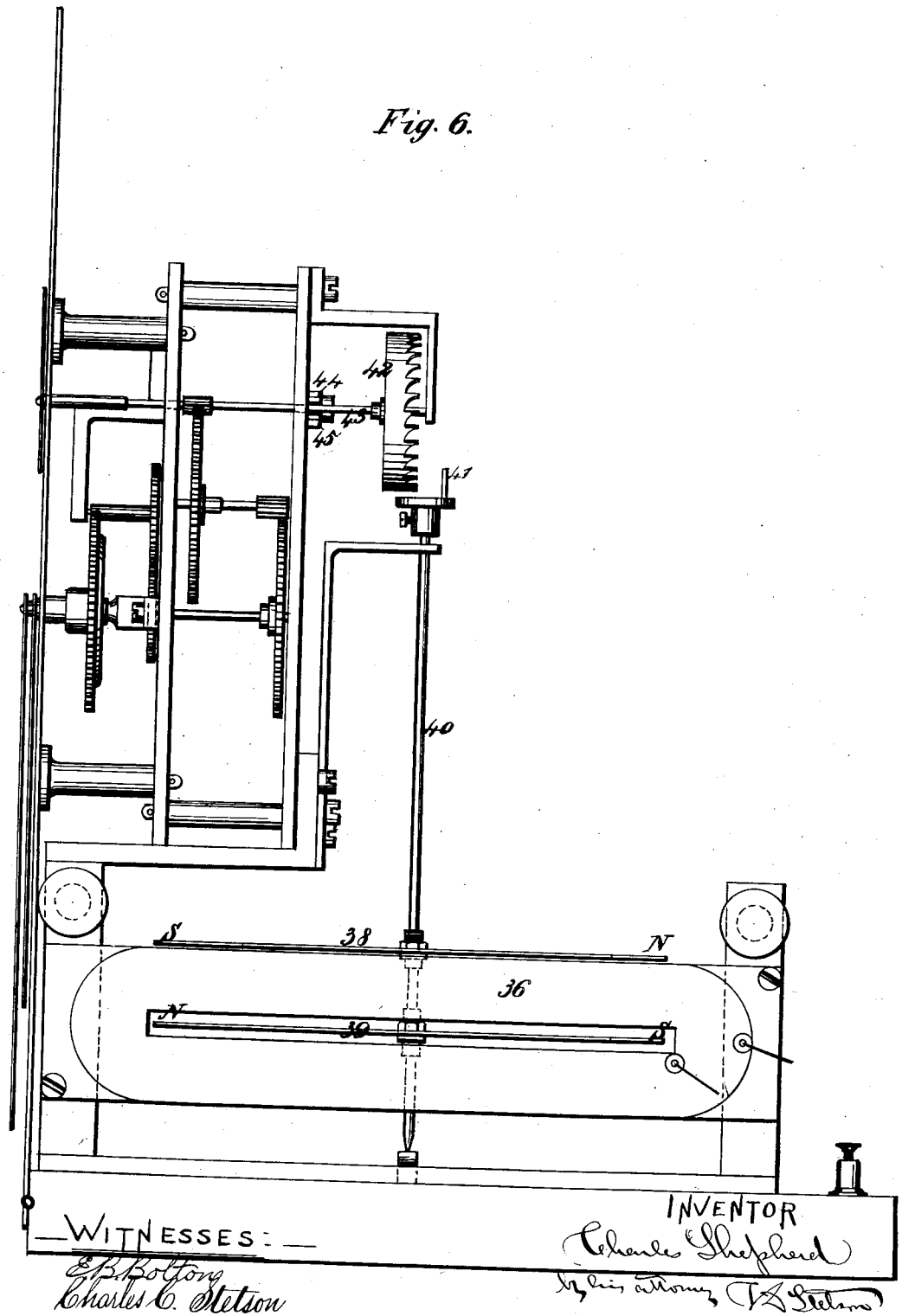

C. SHEPHERD.
Electro-Magnetic Clock.
No. 222,424. Patented Dec. 9, 1879.

C. SHEPHERD.
Electro-Magnetic Clock.
No. 222,424. Patented Dec. 9, 1879.
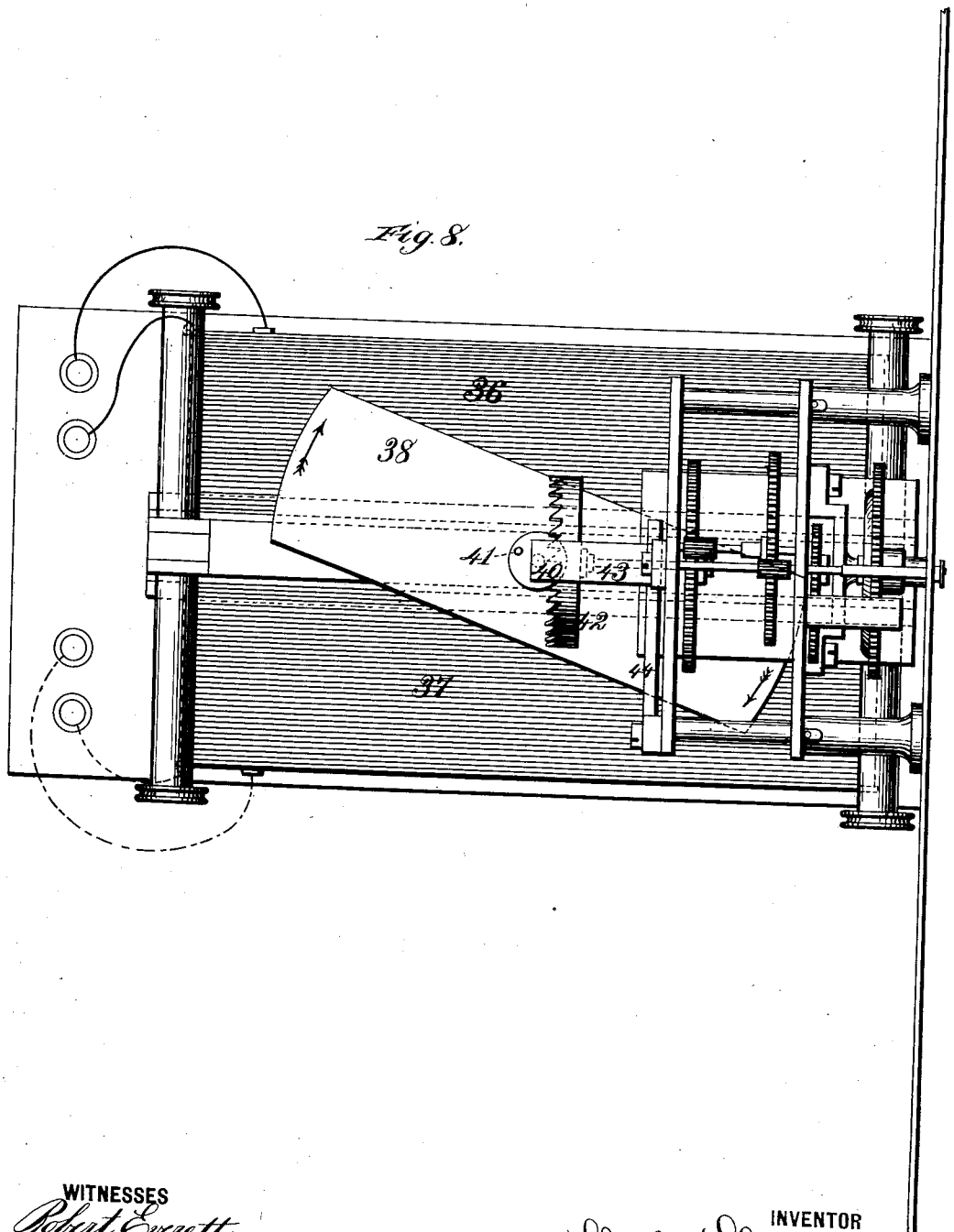

UNITED STATES PATENT OFFICE.

CHARLES SHEPHERD, OF ALEXANDRA ROAD, ST. JOHN'S WOOD, COUNTY OF MIDDLESEX, GREAT BRITAIN.

IMPROVEMENT IN ELECTRO-MAGNETIC CLOCKS.

Specification forming part of Letters Patent No. 222,424, dated December 9, 1879; application filed June 4, 1879; patented in England, June 20, 1878.

*To all whom it may concern:*

Be it known that I, CHARLES SHEPHERD, of Alexandra Road, St. John's Wood, in the county of Middlesex, Kingdom of Great Britain and Ireland, have invented new and useful Improvements in Electro-Magnetic Clocks, of which the following is a specification.

This invention has for its object improvements in electro-magnetic clocks, and is designed to prevent their stopping in the event of failure of a battery or of accidental cutting of a circuit. For this purpose, in conjunction with a suitable pendulum, I arrange two or more separate and distinct circuits, each having two batteries sending reverse currents. Each of these batteries I make sufficiently powerful to be (alone) capable of keeping the clock or clocks going.

In the circuits I provide for each clock coils in juxtaposition, to which I arrange permanent magnets on an arbor operating in gear or connection with the train of clock-work. The pendulum is in connection with each circuit. By this arrangement the magnets will be kept revolving in perfect synchronism with the pendulum.

In carrying out my invention I use heavy broad bar-magnets, which I so arrange in relation to coils as to somewhat resemble an ordinary galvanometer.

If the coils of such an arrangement are made part of a circuit of a single cell of a galvanic battery, the circuit being made and broken by a pendulum, the bar-magnet, after having been once started revolving, will continue to revolve synchronously with the motion of the governing-pendulum, making one revolution to each double vibration of the pendulum. This will continue, notwithstanding great variations in the power of the electric current used, and even if that power should be many times more than is necessary to keep the magnets in motion. Hence, the coils being divided into separate circuits, each having a separate battery and contact-spring for making and breaking contact with the pendulum, as described, each battery, acting in its own circuit, is by itself able to keep the bar-magnets revolving, as already mentioned. Thus, for example, if four batteries are used, should three out of the four fail, or should their communicating wires be damaged, the fourth battery would suffice to keep all the magnets revolving.

The electric current required to keep the bar-magnets revolving is so small that a large number of them may be kept going by a single cell, the coils of each clock being a separate branch, leak, or circuit between the main wires connected with the poles of the cell or battery.

My invention may be applied to the driving of one, two, or other number of clocks. In the drawings I have shown it as applied to the driving of three clocks, a separate set of coils being provided for actuating the pendulum; but where only one train of clock-work is required to be driven, the same set of coils and magnets that drives the train of wheels for moving the hands over the dial may also actuate the pendulum, as will be hereinafter explained.

Referring to the accompanying drawings, Figure 1 is a diagram showing an arrangement of batteries and connections for working clocks on my plan.

Four batteries are here represented in two circuits; but two batteries may be used in one circuit; or the number of circuits may be increased, if desired. Four batteries, as represented, will be found to give ample security against accidental failure of batteries, as also against accidents to which the wires may be exposed in a house, or even in a large establishment where many clocks are required.

A' A² are the batteries of the left circuit. 1$^\times$ and 2$^\times$ are the main wires connected with these batteries.

The carbon C of A' and the zinc of A² are connected with main wire No. 1$^\times$, represented by dots and lines alternating, thus: . — . — . — .) This wire is carried round, so as to join both ends to the spot from which it starts.

The zinc of A' and carbon of A² are connected, respectively, with the contact-springs 1 and 2. (See also Fig. 3.)

The insulated pieces of platinum 3 and 4, attached to the pendulum-rod 5, are connected by the fine spiral spring 6 to the binding-screw 7, from which leads the main wire No. 2*, (represented by dots, thus: ..........,) which main wire, after making the round parallel to main wire No. 1*, returns to binding-screw 7.

As the pendulum 5 swings to the left, the platinum 3 will be brought into contact with spring 1, thereby completing the circuit from Z of battery A', through the spiral spring 6, to binding-screw 7. The main wire 1* will now be positively polarized, and the main wire 2* negatively polarized. On the swing of the pendulum to the right, contact will be broken between 1 and 3, and made between 2 and 4, bringing battery A² into action. This will produce an opposite state of polarization of the main wires. No. 1˟ will now be negative, and No. 2˟ positive.

At 8, 9, and 10 are represented the coils of three clocks, such as are hereinafter described with reference to Figs. 6, 7, and 8, and at 11 are represented the four coils necessary to keep the pendulum in motion, as hereinafter described with reference to Figs. 2, 3, 4, and 5.

The whole of the left coils are connected by branch wires with the main wires 1˟ and 2˟, the inner end or commencement of each coil being connected with No. 1˟, and the outer ends being connected with No. 2˟.

As the pendulum swings to the left, making No. 1* positive and No. 2˟ negative, currents of electricity will pass from main wire No. 1˟ to the inner ends of all connected coils, and back by the outer ends of such coils to No. 2˟ main wire. As the pendulum swings to the right, currents will pass through all the coils in the reverse direction from main wire 2˟ through the coils to main wire 1˟.

Connecting the clocks in the way described—that is to say, as separate branches, or what I call "leaks"—has this great advantage, viz: that the whole of the main wires may be cut through at any one point of their course without stopping the clocks. Thus, for example, should the wires be cut at X X, the coils at 8 and 9 would receive the electric currents by the portions X' X' of the main wires, and the coils at 10 and 11 would receive the electric currents by the portions X² X² of the main wires.

The batteries B' B² are connected with the main wires 3˟ and 4˟ and the contact-springs 12 and 13, and, as the pendulum swings, act precisely as described in reference to the left circuit, only these batteries are made to send their currents through the right-hand coils of all the connected clocks, these currents passing simultaneously with, and acting in unison with, the currents sent through the left coils by the batteries of the left circuit.

The two circuits, with their separate batteries, acting only as a reserve to each other, should the batteries of one fail, or the wires be accidentally damaged, the other is capable of doing all the necessary work, keeping the whole of the clocks in the system going.

Figs. 2, 3, 4, and 5 illustrate the arrangement for keeping a pendulum in motion by revolving bar-magnets. 16 17 18 are three bar-magnets. 19, 20, 21, and 22 are four coils of insulated wire. The three magnets are fixed on an arbor, 23, so as to revolve freely—the upper and lower in the slots of the coils, the middle one between the coils. The magnets are fixed with their poles alternating, as shown by the letters N S S N, so that when electric currents are sent through the coils in the same direction the action on all three magnets will be to turn or deflect them in the same direction.

1, 2 and 12 and 13 are four contact-springs tipped with platinum. 3, 4, 14, and 15 are four pieces of platinum attached to but insulated from the pendulum by pieces of ivory. The two 3 and 4 are connected with the insulated binding-screw 7 by the fine spiral spring 6.

14 and 15 are connected with the binding-screw 24 by the fine spiral spring 25. As the pendulum swings it alternately makes and breaks contact between the pieces of platinum attached to the pendulum and the contact-springs, which, being connected with galvanic batteries, as already explained, causes electric currents to pass through the coils 19, 20, 21, and 22. If the magnets are now started, revolving in the direction indicated by the arrow in Fig. 4, they will be found to be perfectly under the control of the pendulum, making one revolution for each double vibration.

The arbor 23, on which the revolving magnets are fixed, carries a collet with a pin, 26, fixed in it, which, as it revolves, acts against an arm or rod, 27, lifting it into the position shown by dotted lines in Fig. 2, at the same time moving an arm or rod, 28, which is fixed to the same arbor, 29, and thereby causing a part, 30, projecting from the said arm or rod (see Fig. 5) to pass and become held by the hooked end of a detent, 31. (See Fig. 3.) As the pendulum returns to the left, the pointed screw 32, acting on the arm 31˟ of the detent, lifts the detent and liberates the arm or rod 28, which, aided by the gravity of a weight, 34, on the arm or rod 27, attached to the same arbor as 28, presses against the screw 33, and in the return vibration of the pendulum to the right follows it and gives the necessary impulse to keep the pendulum in motion. The pendulum having completed its swing to the right, the magnets will have made an entire revolution, and the pin 26 will again come in contact with the lever 27, and, lifting it, will once more lock or engage the projection 30 of the impulse arm or rod 28 in the detent 31 in readiness to be released for giving another impulse to the pendulum 5.

The collet carrying the pin 26 is fixed on the arbor 23 by a screw, so that it can be moved and adjusted to lift the impulse arm or rod 27 at the desired moment, when the pendulum completes its swing to the right.

Figs. 6, 7, and 8 show the method of applying the rotary magnets to driving sympathetic clocks. These, when of ordinary size—say up to dials two feet in diameter—will not require so much power as a pendulum to keep them going. Two coils, as represented in these drawings, will be found sufficient; but for larger dials, with the hands exposed to the wind, eight or more coils of larger size might be required, the size of coil, weight of the magnets, and thickness of wire all being increased in proportion to double the dimensions, so as to give the required power.

36 and 37 are two coils of wire. 38 and 39 are bar-magnets. 40 is the arbor carrying the magnets, so that they may revolve freely, one in the slot of the coils and the other above the coils.

The magnets are fixed with their poles in opposite directions, as represented by the letters N S N S.

I may here remark that in practice I have found it desirable that the coils I have shown should each contain about one thousand five hundred yards of No. 35 wire, Birmingham wire-gage, and should be made of the thinnest brass consistent with the necessary strength; also, that the slots through which the magnets revolve should be made as narrow as possible, as the closer the coils of wire are to the magnets the greater is the power that will be obtained from a given quantity of electricity.

I have also found it desirable to make the magnets (for the clock shown) about four and one-half inches long, one and one-fourth inch wide, and one-twentieth of an inch thick, and of a weight of about five hundred grains. I start the magnets revolving by hand.

The arbor 40 carries at its upper end a collet with a pin, 41, fixed in it, which is so adjusted as to take into the teeth of the escape-wheel 42, having thirty teeth, moving it forward one tooth, or two seconds for each revolution of the magnets.

The arbor 43 of the escape-wheel is held by two springs, 44 45, which are made to press with such force as to prevent the wheel from moving except when acted upon by the pin 41.

The train of clock-work represented as being thus driven is an ordinary arrangement minus springs or weights.

It will be evident that other arrangements of clock-work may be actuated on my plan, and that, instead of the escape-wheel with thirty teeth, a wheel of sixty teeth may be used in conjunction with two pins in the collet, so as to cause the hand to indicate seconds.

Other methods than that I have shown may be employed to communicate motion from the arbor carrying the magnets to the train of clock-work employed. For instance, the arbor may carry a pinion in gear with a toothed wheel on the arbor 43, or its equivalent.

I would also remark that if a pinion be fixed (in place of the collet) on the top of the arbor 40, and taking into an ordinary toothed wheel having the proper number of teeth, a continuous rotary motion may be produced for driving telescopes, &c.

Should it be desired in any case, the train of wheels or clock-work operating the hands in a clock might be driven from the arbor carrying the revolving magnets, whereby the pendulum is actuated.

The arrangement of magnets and coils shown in Figs. 2, 3, 4, and 5 would be found of ample power for these two purposes. I do not, however, recommend the use of the same magnets for the two purposes.

I claim as my invention—

1. In an electro-magnetic clock, the combination of a pendulum and two or more separate and distinct circuits, each having two batteries arranged to send reverse currents, substantially as hereinbefore described, for the purpose specified.

2. In an electro-magnetic clock, the combination, with a pendulum, 5, and clock mechanism, of batteries $A'$ $A^2$ $B'$ $B^2$, main wires $1^\times, 2^\times, 3^\times$, and $4^\times$, coils for operating magnets to drive clock mechanism 8 9 10 11, and branch wires or leaks, whereby the requisite currents are caused to pass through said coils, even when the main wires are cut or divided at any one place, substantially as described.

3. An electro-magnetic clock provided with an escape-wheel, 42, on an arbor, 43, an arbor, 40, carrying a collet with pin 41, adjusted to take into the teeth of said escape-wheel, bar-magnets 38 39, fixed on said arbor 40, coils of wire 38 39, arranged in juxtaposition to said coils, conducting or circuit wires connecting said coils with batteries and with other coils, 19 20 21 22, an arbor, 23, carrying magnets 16 17 18, and means for operating a pendulum, 5, by the rotation of said magnets and arbor, the whole so arranged as to keep the magnets revolving in perfect synchronism with the pendulum, substantially as hereinbefore described and illustrated.

CHARLES SHEPHERD.

Witnesses:
W. LLOYD WISE,
    *Patent Agent, London.*
F. J. BROUGHAM,
    *Adelphi, London, W. C.*